(12) United States Patent
Hughes, Jr. et al.

(10) Patent No.: US 8,667,737 B2
(45) Date of Patent: Mar. 11, 2014

(54) WEATHER SEAL FOR A VEHICLE DOOR

(75) Inventors: Raymond W. Hughes, Jr., Marysville, OH (US); Kenneth M. Hartlaub, Powell, OH (US)

(73) Assignee: Honda Motor Co., Ltd, Tokyo (JP)

( * ) Notice: Subject to any disclaimer, the term of this patent is extended or adjusted under 35 U.S.C. 154(b) by 672 days.

(21) Appl. No.: 11/684,603

(22) Filed: Mar. 10, 2007

(65) Prior Publication Data

US 2008/0022600 A1 Jan. 31, 2008

Related U.S. Application Data

(60) Provisional application No. 60/820,400, filed on Jul. 26, 2006.

(51) Int. Cl.
*E06B 7/16* (2006.01)

(52) U.S. Cl.
USPC ....... 49/479.1; 49/475.1; 49/492.1; 49/495.1; 49/476.1

(58) Field of Classification Search
USPC ............ 49/475.1, 479.1, 492.1, 495.1, 484.1, 49/476.1
See application file for complete search history.

(56) References Cited

U.S. PATENT DOCUMENTS

| | | | |
|---|---|---|---|
| 1,823,647 A | 2/1931 | Duffy | |
| 2,222,200 A | 11/1940 | Geyer | |
| 2,240,181 A | 4/1941 | Fairbank | |
| 3,074,754 A | 1/1963 | Komenda | |
| 3,164,870 A * | 1/1965 | Stolarczyk et al. | 49/495.1 |
| 3,239,268 A | 3/1966 | Loughary | |
| 3,726,559 A | 4/1973 | Wilfert et al. | |
| 4,026,598 A * | 5/1977 | Koike | 296/146.9 |
| 4,111,250 A * | 9/1978 | Bauer | 152/187 |
| 4,150,509 A | 4/1979 | Knap | |
| 4,277,099 A | 7/1981 | Klein et al. | |
| 4,355,841 A | 10/1982 | Ghidella et al. | |
| 4,607,878 A | 8/1986 | Itoh | |
| 4,892,348 A | 1/1990 | Nozaki | |
| 4,911,495 A | 3/1990 | Haga et al. | |
| 5,366,267 A * | 11/1994 | Nozaki | 296/216.09 |
| 5,511,344 A | 4/1996 | Dupuy | |
| 5,671,967 A * | 9/1997 | Gurganus et al. | 296/146.9 |
| 5,918,421 A * | 7/1999 | Nozaki | 49/492.1 |
| 6,077,576 A | 6/2000 | Osborn | |
| 6,138,415 A * | 10/2000 | Ohtsu et al. | 49/490.1 |
| 6,264,268 B1 | 7/2001 | Goodger | |
| 6,397,525 B1 * | 6/2002 | Ishibashi et al. | 49/484.1 |
| 6,405,489 B1 * | 6/2002 | Miura | 49/479.1 |
| 6,527,278 B1 | 3/2003 | Norris | |
| 6,536,833 B2 * | 3/2003 | Nozaki | 296/146.9 |
| 6,601,346 B2 * | 8/2003 | Nozaki | 49/498.1 |
| 6,641,204 B2 * | 11/2003 | Ogawa et al. | 296/146.9 |

(Continued)

*Primary Examiner* — Katherine Mitchell
*Assistant Examiner* — Marcus Menezes
(74) *Attorney, Agent, or Firm* — Mark Duell; Michael A. Forhan; Eley Law Firm Co., LPA

(57) ABSTRACT

A weather seal for a door of a vehicle includes a base configured to be attached to the door. At least one seal lip extends longitudinally along the base and outwardly from the base, the seal lip configured to sealingly engage a door sill of the vehicle to close a gap formed between the door and the sill. At least one shield is coupled to at least one of the base and the seal lip. The shield is located proximate a predetermined exterior portion of a body of the vehicle when the door is proximate the sill, the shield covering the exterior body portion.

19 Claims, 4 Drawing Sheets

(56) References Cited

U.S. PATENT DOCUMENTS

| | | | |
|---|---|---|---|
| 6,814,393 B2 * | 11/2004 | Nagata | 296/146.9 |
| 6,827,390 B2 | 12/2004 | Zummallen et al. | |
| 7,083,222 B2 | 8/2006 | Oda et al. | |
| 7,086,200 B2 | 8/2006 | Rathgeb | |
| 7,578,098 B2 * | 8/2009 | Furuzawa et al. | 49/498.1 |
| 2001/0008058 A1 * | 7/2001 | Kawai et al. | 49/479.1 |
| 2001/0015035 A1 * | 8/2001 | Nozaki | 49/440 |
| 2004/0216384 A1 * | 11/2004 | Teramoto et al. | 49/479.1 |
| 2006/0042170 A1 * | 3/2006 | Furuzawa et al. | 49/489.1 |
| 2007/0000180 A1 * | 1/2007 | Oba et al. | 49/498.1 |
| 2007/0024084 A1 * | 2/2007 | Oba et al. | 296/146.9 |

* cited by examiner

WEATHER SEAL FOR A VEHICLE DOOR

This application claims priority to U.S. provisional application 60/820,400, filed Jul. 26, 2006, the contents of which are hereby incorporated by reference.

FIELD

The present invention relates generally to vehicle door seals, particularly to a weather seal that deters damage to painted portions of a vehicle body proximate a door opening.

BACKGROUND

Vehicle doors are usually mounted on each side of the vehicle for pivotal movement between open and closed positions with respect to a corresponding door opening. The doors are sized to permit ingress and egress of the vehicle's occupants, and are typically shaped to conform to the door opening and the styling of the vehicle body. In some vehicle designs the styling may be such that portions of the body proximate the door are not co-planar with the door, instead extending slightly outwardly of the door for aesthetic and/or functional purposes. Consequently, a recessed area is formed by the exterior surfaces of the door and the body. This recessed area tends to confront materials such as sand, salt and debris thrown up from the road. These materials can abrade, chip or wear away the finish of the body, detracting from the aesthetics of the vehicle and exposing the substrate of the body to the elements, eventually causing the substrate to degrade.

Current vehicle designs may attempt to protect the body from road-borne objects by applying a relatively thin sheet of adhesive-backed plastic to damage-prone portions of the body. However, the plastic sheets are subject to delamination, thus exposing the body to unsightly damage. Other vehicle designs may include a protective plastic coating material that is sprayed onto the body. While effective, sprayed-on coatings are labor-intensive to apply and add to the cost of the vehicle. Conventional door weather seals generally prevent outside elements from entering the interior of the vehicle and may prevent damage from road-borne materials in those areas covered by the seals. Unfortunately, conventional seals are shaped to conform to the shape of the door and do not extend much beyond that shaped envelope, merely filling a gap formed between the door and the door opening. There is a need for a simple, low-cost and durable way to protect portions of the body of a vehicle from damage caused by road-borne materials impacting areas proximate the door openings.

SUMMARY

A weather seal for a vehicle door is disclosed according to an embodiment of the present invention. The weather seal includes a shield that is configured to extend beyond the contiguous envelope of the door to cover a predetermined exterior portion of a vehicle body proximate a door opening, thus protecting the body from damage due to road-borne debris.

One object of the present invention is a weather seal for a door of a vehicle. The weather seal includes a base configured to be attached to the door. At least one seal lip extends longitudinally along the base and outwardly from the base, the seal lip configured to sealingly engage a door sill of the vehicle to close a gap formed between the door and the sill. At least one shield is coupled to at least one of the base and the seal lip. The shield is located proximate a predetermined exterior portion of a body of the vehicle when the door is proximate the sill, the shield covering the exterior body portion.

Another object of the present invention is a method for protecting an exterior portion of a body of a vehicle. The method comprises the steps of attaching a base to a door of the vehicle, the base extending longitudinally along a surface of the door; and extending at least one seal lip longitudinally along the base and outwardly from the base to sealingly engage a door sill of the vehicle, thereby closing a gap formed between the door and the sill. Further steps include coupling at least one shield to at least one of the base and the seal lip; and locating the shield proximate a predetermined exterior portion of a body of the vehicle when the door is proximate the sill such that the shield covers the exterior body portion.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
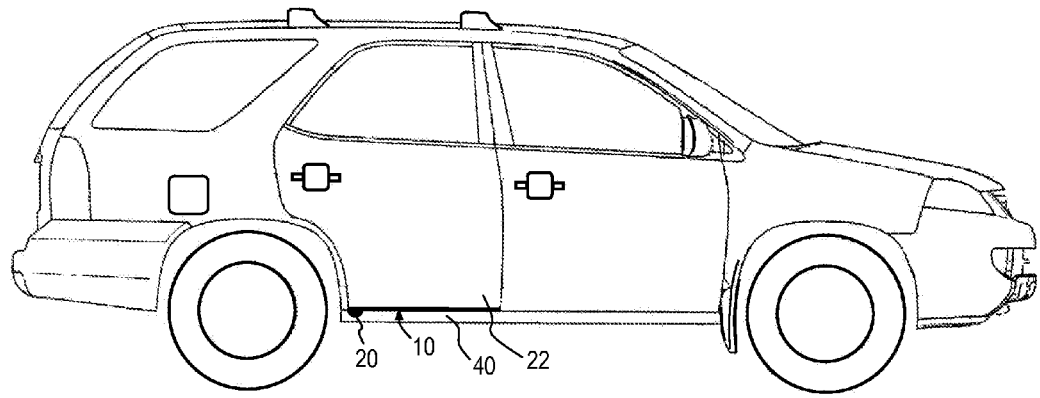
FIG. 1 shows the general arrangement of a weather seal for a vehicle door according to an embodiment of the present invention.
Figure 2:
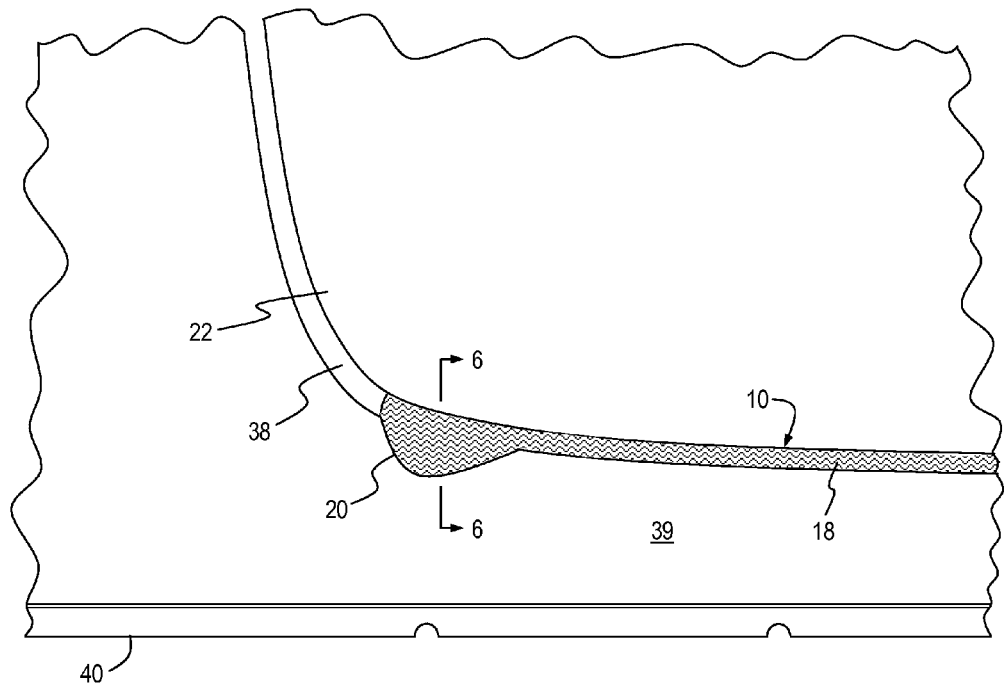
FIG. 2 is an expanded view showing the lower aft portion of a vehicle door and a corresponding door opening with the weather seal of FIG. 1 installed.

The general arrangement of a weather seal 10 for a vehicle door is shown in FIGS. 1 through 4 according to an embodiment of the present invention. Weather seal 10 comprises in pertinent part a base 12, a first seal lip 14, a second seal lip 16, a third seal lip 18 and a shield 20.

Figure 3:
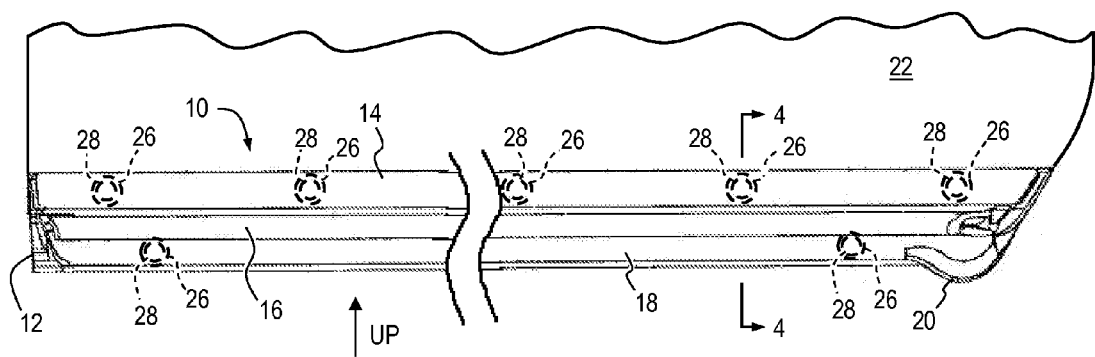
FIG. 3 shows details of a weather seal attached to the interior side of a vehicle door according to an embodiment of the present invention.
Figure 4:
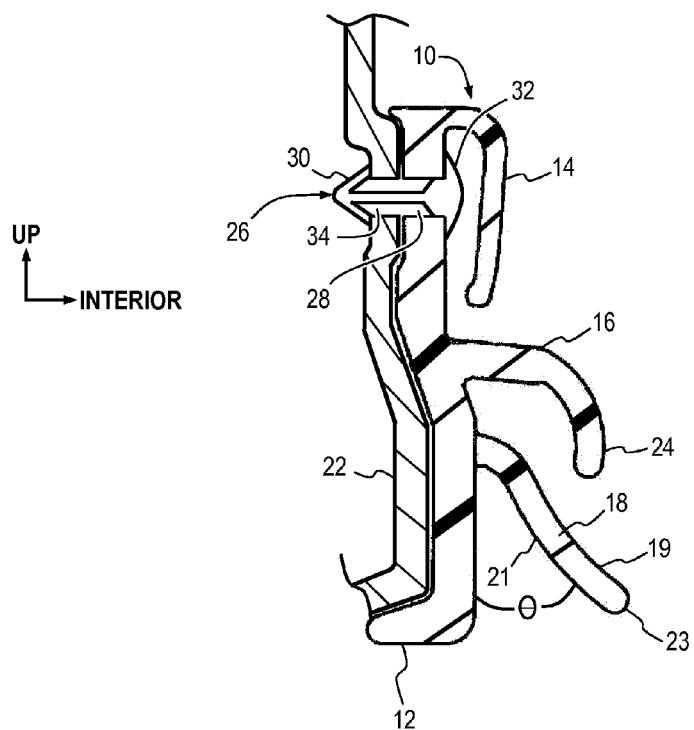
FIG. 4 is a view in section of the weather seal of FIG. 3.

Base 12 is configured to attach to a lower portion of a vehicle door 22, as shown in FIGS. 3 and 4, and to conform to the shape of a portion of the door. Base 12 is preferably resilient and may be made from any elastic material suitable for use in the expected environment for weather seal 10 including, without limitation, natural rubber and synthetic elastomeric compounds such as thermoplastic elastomer (TPO). Base 12 may be made using any conventional process, such as molding and extrusion.

A first, generally planar seal lip 14 extends longitudinally along the length of weather seal 10, as shown in FIG. 3. Seal lip 14 is cantilevered from base 12 and is also spaced apart from the base, being oriented generally parallel to the base as shown in FIG. 4. In one embodiment of the present invention first seal lip 14 is made integral with base 12, and is made of a like material. In other embodiments first seal lip 14 may be made as a separate element and attached to base 12 by any conventional fastening means such as, without limitation, adhesives, co-molded, heat fused and fasteners. If made separately, first seal lip 14 is preferably resilient and may be made from any elastic material suitable for use in the expected environment for weather seal 10 including, without limitation, natural rubber and synthetic elastomeric compounds such as TPO.

A second seal lip 16 extends longitudinally along the length of weather seal 10, as shown in FIG. 3, and is below first seal lip 14. Second seal lip 16 is cantilevered from base 12, extends outwardly from the base and includes a portion 24 that curves downwardly to an orientation generally parallel to the base, as shown in FIG. 4. In one embodiment of the present invention second seal lip 16 is made integral with base 12, and is made of a like material. In other embodiments second seal lip 16 may be made as a separate element and attached to base 12 by any conventional fastening means such as, without limitation, adhesives, co-molded, heat fused and fasteners. If made separately, second seal lip 16 is preferably resilient and may be made from any elastic material suitable for use in the expected environment for weather seal 10 including, without limitation, natural rubber and synthetic elastomeric compounds such as TPO.

A third seal lip 18 extends longitudinally along the length of weather seal 10, as shown in FIG. 3, and is below second seal lip 16. Third seal lip 18 is cantilevered from base 12 and extends outwardly from the base at a predetermined angle θ, as shown in FIG. 4. With additional reference to FIG. 4, third seal lip 18 includes a first, interior-facing surface 19, an opposing second, exterior-facing surface 21, and a distal end 23 between the first and second surfaces. In one embodiment of the present invention third seal lip 18 is made integral with base 12, and is made of a like material. In other embodiments third seal lip 18 may be made as a separate element and attached to base 12 by any conventional fastening means such as, without limitation, adhesives, co-molded, heat fused and fasteners. If made separately, third seal lip 18 is preferably resilient and may be made from any elastic material suitable for use in the expected environment for weather seal 10 including, without limitation, natural rubber and synthetic elastomeric compounds such as TPO.

Figure 5:
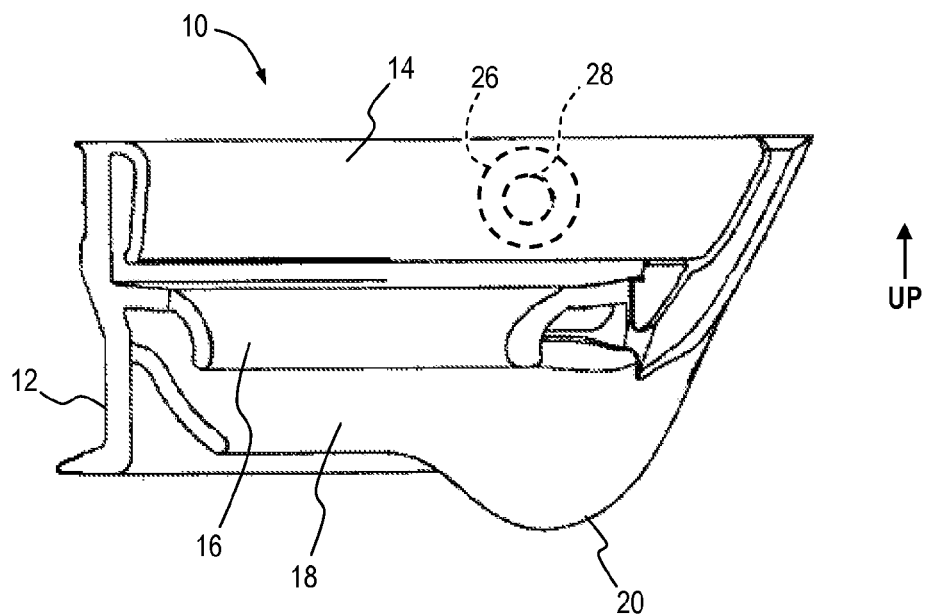
FIG. 5 is an expanded view showing a shield portion of the weather seal of FIG. 3.
Figure 6:
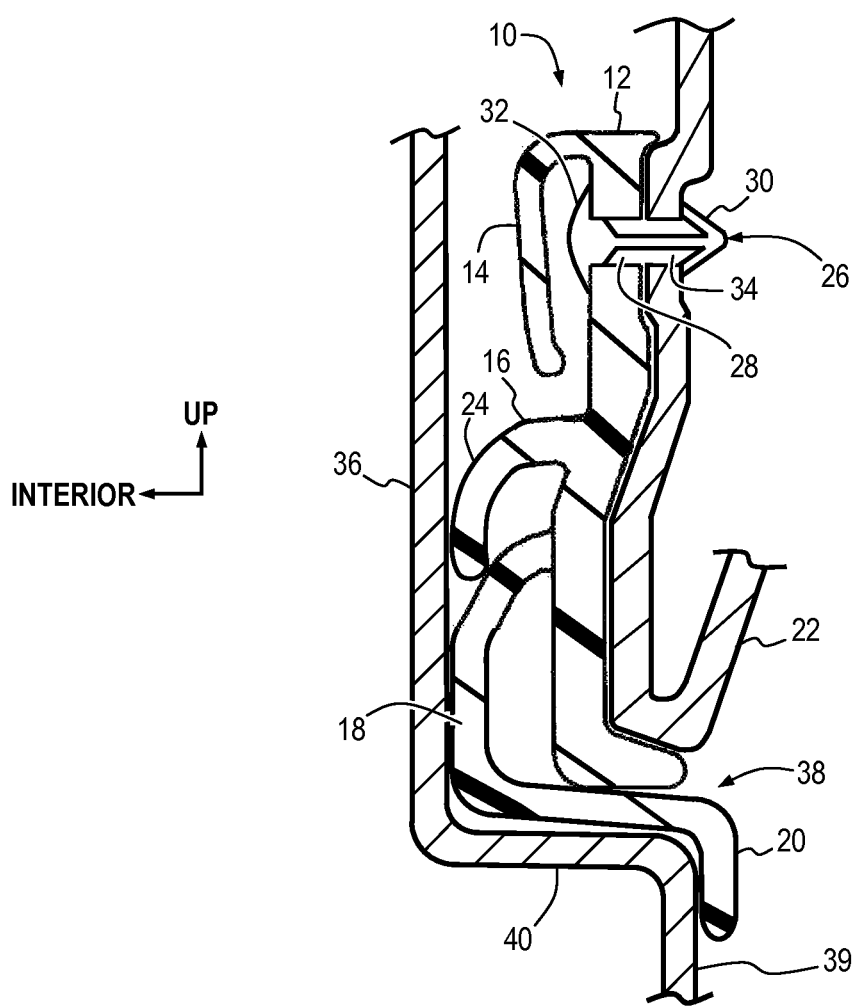
FIG. 6 is a view in section showing a weather seal disposed intermediate a door and a structure of a vehicle according to an embodiment of the present invention.

Shield 20 is generally planar, shaped to conform to the body portion it is designed to shield, and extends generally downwardly below base 12, as shown in FIGS. 3 and 5. As a non-limiting example, shield 20 may be semi-circularly shaped. In one embodiment of the present invention shield 20 is made integral with third seal lip 18, and is made of a like material. In other embodiments of the present invention shield 20 may be made integral with any or all of base 12 and seal lips 14, 16, 18 and may be made of a like material. In still other embodiments shield 20 may be made as a separate element and attached to any, some or all of base 12 and seal lips 14, 16, 18 by any conventional fastening means such as, without limitation, adhesives, co-molded, heat fused and fasteners. If made separately, shield 20 is preferably resilient and may be made from any elastic material suitable for use in the expected environment for weather seal 10 including, without limitation, natural rubber and synthetic elastomeric compounds such as thermoplastic elastomer (TPO). Shield 20 may be made using any conventional process, such as molding and extrusion.

The orientation, size and shape of shield 20 may be altered in various embodiments to generally cover any desired exterior area of the vehicle body. Furthermore, portions or all of shield 20 may be arced and/or made nonplanar as desired, such as to cover curved or complex body surfaces. While only one shield 20 is shown for purposes of illustration, it is understood that a plurality of shields may be made integral with and/or coupled to weather seal 10.

With continued reference to FIGS. 3 and 4, a plurality of fasteners, such as conventional push-in fasteners 26, may be inserted into openings 28 of base 12 such that an engagement member 30 of the fastener extends through the opening and a retaining portion 32 of the fastener is intermediate the base and first seal lip 14. Alternatively, weather seal 10 may be attached to door 22 with other types of conventional fasteners including, without limitation, clips, screws and molded-in fittings, or with adhesive.

With reference now to FIGS. 1 through 6 in combination, weather seal 10 is attached to vehicle door 22 by placing the weather seal proximate a lower, interior portion of the door such that the engagement members 30 of fasteners 26 engage corresponding receptacles 34 in the door. In operation, when door 22 is closed a lower portion of the door is positioned proximate a door sill 36, forming a gap 38. Weather seal 10, which is mounted to an interior surface of door 22, is urged into contact with door sill 36 such that second seal lip 16 sealingly engages the door sill. In addition, third seal lip 18 is urged into gap 38, thereby substantially closing off the gap proximate door sill 36. Furthermore, when door 22 is closed shield 20 is placed into proximity to an exterior portion, i.e., a portion of an exterior surface 39 of a body 40 of the vehicle, such as a fender or rocker panel. Shield 20 protects the covered portion of surface 39 from damage due to impact and/or abrasion from road-borne materials such as sand, salt and debris.

Although the foregoing embodiments of the present invention disclose a weather seal 10 that is attached to a door 22, it is anticipated that in other embodiments of the present invention the weather seal may instead be attached to door sill 36 and/or body 40.

While this invention has been shown and described with respect to a detailed embodiment thereof, it will be understood by those skilled in the art that changes in form and detail thereof may be made without departing from the scope of the claims of the invention. For example, it will be understood that right-hand and left-hand configurations can be made as mirror images without departing from the spirit and scope of the invention. Furthermore, although a weather seal having three seal lips is described herein, a greater or lesser number of seal lips having various sizes and shapes may be employed to suit a particular vehicle and door design, within the scope of the invention.

What is claimed is:

1. A weather seal in combination with a door of a vehicle, comprising:
    a base having a single elongate axis, the base being configured to be attached to the door;
    at least one seal lip extending along the elongate axis of the base and being cantilevered away from the base, the seal lip having a first surface, an opposing second surface, and a distal edge extending between the first and second surfaces, the distal edge being generally parallel to the elongate axis of the base, the seal lip contacting a door sill of the vehicle when the door is in a closed position, with the first surface of the seal lip being facially adjacent to the door sill and contacting the door sill when the door is in a closed position and the second surface of the seal lip being facially adjacent to the base, the seal lip closing a gap formed between the door and the sill when the door is in the closed position; and
    at least one shield directly connected to the seal lip and being cantilevered from the distal edge of the seal lip, the shield extending from the distal edge of the seal lip, beyond the distal edge of the seal lip and through the gap covering and in contact with a portion of an exterior surface of a body of the vehicle when the door is in the closed position, the shield protecting said covered body exterior surface portion from damage.

2. The weather seal of claim 1, wherein the at least one seal lip comprises a pair of seal lips cantilevered away from the base, the shield being directly connected to a select one of the seal lips and extending beyond the distal edge of the select seal lip.

3. The weather seal of claim 1, wherein the at least one seal lip comprises three seal lips cantilevered away from the base, the shield being directly connected to a select one of the seal lips and extending beyond the distal edge of the select seal lip.

4. The weather seal of claim 1 wherein the weather seal is made from a resilient material.

5. The weather seal of claim 4 wherein the weather seal is made of a thermoplastic elastomer.

6. The weather seal of claim 1, further comprising at least one fastener coupled to the base and configured to engage a receptacle of the door.

7. The weather seal of claim 6 wherein the fastener is a push-in fastener.

8. The weather seal of claim 1 wherein the shield is a separate element attached to the seal lip.

9. The weather seal of claim 1 wherein the shield is integral with the seal lip.

10. The weather seal of claim 1 wherein the shield is generally planar and has a generally semicircular shape.

11. The weather seal of claim 1 wherein the shield is configured to cover a portion of the exterior surface of the body of the vehicle proximate a rearward portion of the door.

12. The weather seal of claim 1 wherein the seal lip is a separate element attached to the base.

13. The weather seal of claim 1 wherein the seal lip is integral with the base.

14. A weather seal in combination with a door of a vehicle, comprising:
    a resilient base having a single elongate axis, the base being configured to be attached to the door;
    at least one fastener coupled to the base and configured to engage a receptacle of the door;
    at least one resilient, integral seal lip extending along the elongate axis of the base and being cantilevered away from the base, the seal lip having a first surface, an opposing second surface, and a distal edge extending between the first and second surfaces, the distal edge being generally parallel to the elongate axis of the base, the seal lip contacting a door sill of the vehicle when the door is in a closed position, with the first surface of the seal lip being facially adjacent to the door sill and contacting the door sill when the door is in a closed position and the second surface of the seal lip being facially adjacent to the base, the seal lip closing a gap formed between the door and the sill when the door is in the closed position; and
    at least one resilient, integral shield directly connected to the seal lip and being cantilevered from the distal edge of the seal lip,
    the shield extending from the distal edge of the seal lip, beyond the distal edge of the seal lip and through the gap to cover and in contact with a portion of an exterior surface of a body of the vehicle when the door is in the closed position, the shield protecting said covered body exterior surface portion from damage.

15. The weather seal of claim 14 wherein the shield is generally planar and has a generally semicircular shape.

16. A method for protecting an exterior portion of a body of a vehicle using the weather seal in combination with the door of claim 1, comprising the steps of:
    attaching the base to the door of the vehicle, the base extending longitudinally along a surface of the door;
    extending the at least one seal lip longitudinally along the base and outwardly from the base to sealingly engage the door sill of the vehicle, thereby closing the gap formed between the door and the sill;
    coupling the at least one shield to at least one of the base and the seal lip; and
    locating the shield proximate a predetermined exterior portion of the body of the vehicle when the door is proximate the sill such that the shield covers the exterior body portion.

17. The method of claim 16, further comprising the step of attaching the weather seal to the door with at least one of fasteners and adhesive.

18. The method of claim 16, further comprising the step of selecting a resilient material for at least one of the base, seal lip and shield.

19. The method of claim 16, further comprising the step of locating the shield to cover an exterior body portion proximate a rearward portion of the door when the door is proximate the sill.

* * * * *